Sept. 28, 1965 R. J. BLACK 3,208,266
TESTING APPARATUS
Filed Dec. 26, 1961 3 Sheets-Sheet 1

INVENTOR.
RAYMOND J. BLACK
BY
ATTORNEY

United States Patent Office 3,208,266
Patented Sept. 28, 1965

3,208,266
TESTING APPARATUS
Raymond J. Black, South Bend, Ind., assignor to The Bendix Corporation, South Bend, Ind., a corporation of Delaware
Filed Dec. 26, 1961, Ser. No. 161,829
7 Claims. (Cl. 73—9)

This invention relates to mechanism for testing friction surfaces that are utilized in energy transmission to determine vibrations excited by said friction surfaces.

It is an important object of this invention to simulate actual environment for energy transmitting friction surfaces to determine vibrations that may be excited by said friction surfaces.

It is also an object of this invention to determine the dynamic rating criteria of an energy transmitting friction surface such as oscillatory amplitude of chatter and squeal motions, peak dynamic torque and peak to mean drag ratios induced by the friction surface.

Another object is to adapt a friction surface testing apparatus to simulate the vibrations of the predicted structural environment for said friction surfaces to measure the excitations of said structure by the friction surfaces.

A further object of this invention is to test friction linings under actual operating environments.

A still further object of this invention is to test a brake lining for an aircraft landing gear without going to the expense of fabricating a test program about the actual structure of the landing gear.

And still another object is to predict the squeal and chatter characteristics of a brake lining for a brake installation without testing said lining in the operational environment.

Furthermore, it is an object of this invention to provide a device which permits the reproduction of all the dimensionless or non-unitized amplitudes of vibratory motion of each of the natural modes of the structure to which a friction surface or surfaces are coupled.

Other objects and the many advantages of this invention will be readily appreciated as the same becomes better understood by reference to the following detailed description when considered in connection with the accompanying drawings wherein.

Figure 1:
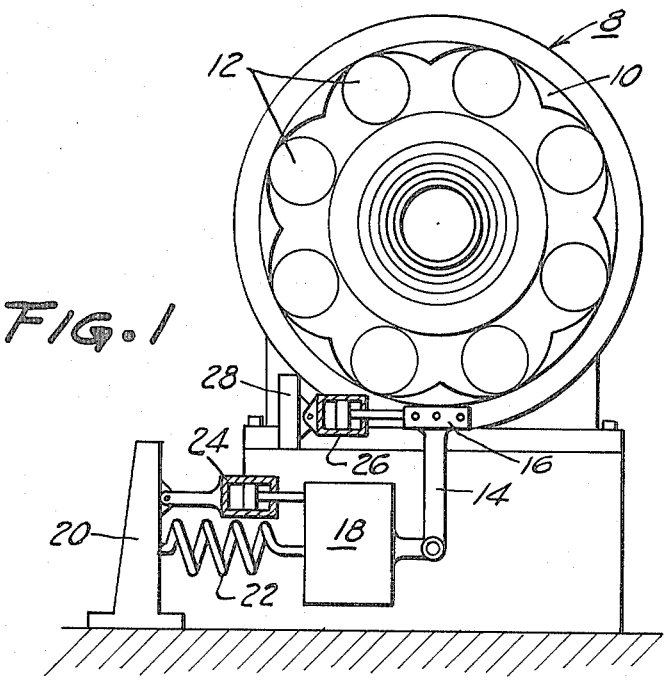
FIGURES 1 and 2 are front and end elevation views, respectively, of apparatus applicable to the practice of the invention.

In accordance with the foregoing objects a need has been present for a test apparatus to provide quality checks on energy transmitting friction surfaces such as may be expected to be utilized, for example, in clutch and brake environments. In fact, present day surfaces, which have been tested under what has to now been thought to be an adequate quality check, have created dynamic problems leading to deterioration of surrounding structure.

In aircraft, in particular, the dynamic problem created by friction surfaces arises from the self-excitation of the natural modes of the aircraft structure. This ability of a given friction surface, such as the clutch and brake linings referred to, to cause vibration of the natural modes of the mechanical system linking said surface to the main body is termed negative damping.

In addition, negative damping is not only characteristic of the lining but is also a function of periodic input resulting from driven and drive members associated with said surface such as may well be appreciated by visualizing a brake assembly having a segmented rotor and a plurality of discs on a brake stator. Furthermore, negative damping is also determined by the physical parameters of the mechanical system with which the friction surfaces are associated.

It may, therefore, be appreciated that the negative damping ability is a factor which cannot be ignored as it has in previous testing apparatus. It is, in fact, a highly irregular factor which must be simulated in the test apparatus to arrive at the necessary dynamic rating criteria such as oscillatory amplitude of chatter and squeal motions, peak dynamic torque and peak to mean drag ratios.

In utilizing the testing apparatus in determining the above characteristics with regard to an aircraft wheel and brake assembly and the support structure therefor, the squeal and chatter modes of the landing gear may be determined.

The chatter mode of an aircraft landing gear consists of fore and aft motion of the wheel, brake, tire, axle, bogie beam, etc. against the elastic restraint of the shock strut; whereas the squeal mode consists primarily of the torsional motion of the brakes, i.e. the torsional motion of the brake stationary parts which is resisted by the linking structure with the landing gear strut. Both of these modes can be written in dimensionless form:

$$n_1 = \frac{2\pi \times f_1}{R_R \dot{\psi}_m}$$

and $$n_2 = \frac{2\pi \theta_2 f_2}{\dot{\psi}_m}$$

where $n_1$=dimensionless chatter amplitude,
$n_2$=dimensionless squeal amplitude,
$x$=fore or aft amplitude of strut chatter motion at axle centerline,
$\theta_2$=angular amplitude of squeal motion of stationary parts of brake,
$f_1$=natural frequency of strut chatter motion,
$f_2$=natural frequency of squeal motion,
$\dot{\psi}_m$=characteristic incremental angular velocity associated with the torque-angular velocity function, and
$R_R$=rolling radius of aircraft tire.

Once the dimensionless chatter and dimensionless squeal are duplicated on the small scale lining tester of this invention by proper scaling of the lining tester parameters, the airplane performance can be predicted directly as follows:

The mean drag on the landing gear system is $$(F_{DO})_A = \frac{(A_A)R_A}{(A_T)R_T}(F_{DO})_T \frac{l_2}{R_R}$$

where $(F_{DO})_A$=airplane mean drag,
$(F_{DO})_T$=lining tester mean drag,
$A_A$=total brake lining area of aircraft landing gear installation,
$A_T$=total lining area on lining tester,
$R_A$=average lining radius on aircraft installation,
$R_T$=average lining radius on tester,
$R_R$=rolling radius of aircraft tire, and
$l_2$=distance on tester from center of draft to center of drag pickup.

The vibratory drag on the airplane may be calculated as follows:

$$(F_{DO})_V = \frac{K_1 R_R R_T f_{1T}}{K_{1T} l_2 R_A f_{1A}}(F_{DV})_T$$

where $(F_{DV})_A$ = airplane vibratory drag,
$(F_{DO})_V$ = lining tester vibration drag,
$K_1$ = fore and aft spring rate of strut,
$K_{1T}$ = torsional spring rate associated with motion of the chatter inertia on the tester, and
$f_{1A}$ and $f_{1T}$ = natural chatter frequency of airplane and tester, respectively.

Similar scaling equations can be derived for the squeal motion of the brake stationary parts.

In duplicating the dimensionless chatter and squeal on a small scale lining tester a mass must be added to the system that is equivalent to the operative arrangement of the predicted environment, and the mass must be added by means that simulate the torsional spring rates, the fore and aft spring rates and the material damping characteristics of the operative arrangement of the predicted environment for the energy transmitting friction surfaces.

Referring now to the drawings, a testing apparatus is shown that incorporates provisions that permit duplication of the above parameters. More particularly, the drawings show a form of the testing apparatus according to the present invention for testing brake linings for use with an aircraft landing gear.

In more detail, FIGURE 1 shows a dynamometer 8 for testing a brake assembly which includes a brake stator 10 having a plurality of brake lining disc 12 affixed thereto by appropriate means. The stator also has a spring lever 14 attached thereto as at 16 which spring lever 14 is also attached by appropriate means to a mass 18.

A stanchion 20 is also shown in FIGURE 1 to be mounted to the floor in the test area and form a fixed connection for a spring 22 and a dashpot type damper 24 that are also connected to the mass 18. In addition, a damper 26 is shown connected to the brake stator 10, as at 16, and to a fixed member 28.

Figure 2:
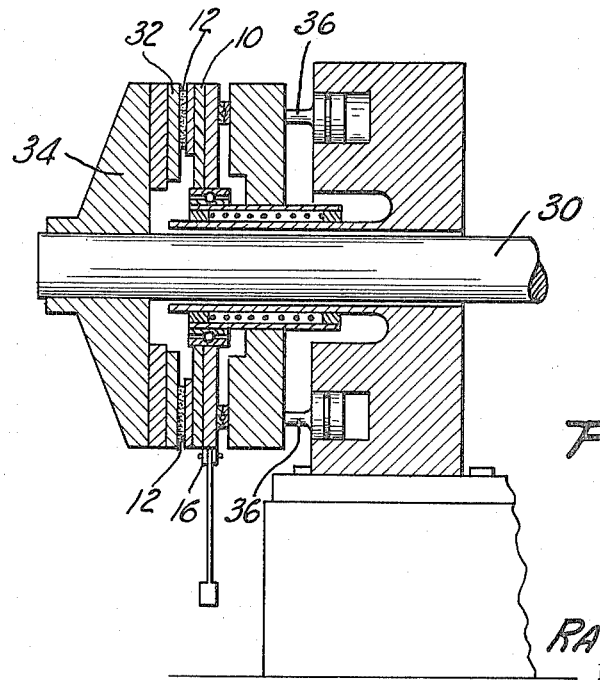

As may be better seen in FIGURE 2, a shaft 30, that is driven by dynamometer 8, extends through the stator 10 and mounts a brake rotor 32 by means of the hub 34 that is drivably attached to the shaft 30.

The mass 18 is equivalent to the lumped mass of the landing gear structure in which the brake discs 12 and stator 10 are utilized. The lumped mass is calculated as the mass of the wheels, brakes, tires, axles, bogie beam (if one is intended) and associated parts plus the polar moment of inertia of all rotating parts divided by the sum of the rolling radius and the equivalent mass of the strut when lumped at the axle. It may be readily appreciated that similar calculations are solved for similar structure mounting other types of friction surfaces to other bodies.

The spring 14 is chosen to have a spring rate equivalent to the spring rate of the linkage transmitting brake torque to the aircraft landing gear strut; and spring 22 is chosen to have a spring rate equivalent to the strut spring rate in the fore and aft direction.

As regards the dampers 24 and 26, they are chosen to have the same material damping capacity as the stationary parts plus torque linkage and the landing gear strut.

The spring rate and damping capacity simulation allows the brake stator and the mass to respond as the airplane structure would respond to brake torque created by applying the brakes to stop the aircraft.

In FIGURE 2 there are shown two actuators 36 operatively connected to the stator 10, which actuators may be operated to move the stator 10 to engage the brake discs 12 with the rotor 32. As may also be seen in the schematic of this actuation system, there are appropriate provisions to allow the stator to be axially movable and to connect said stator to said actuators.

Figure 3:
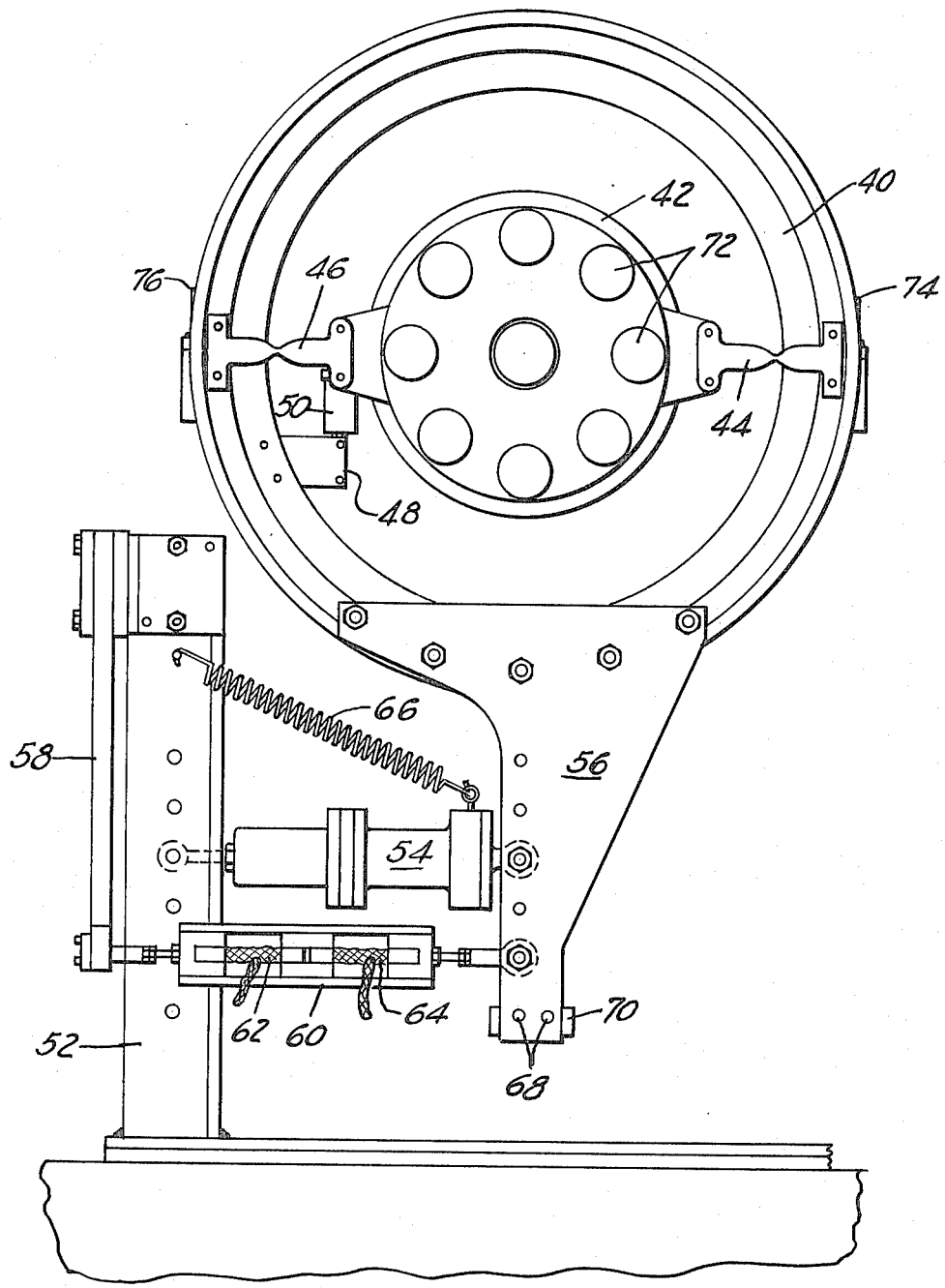
FIGURE 3 is a front elevation of a modified form of apparatus applicable to the practice of the invention.
Figure 4:
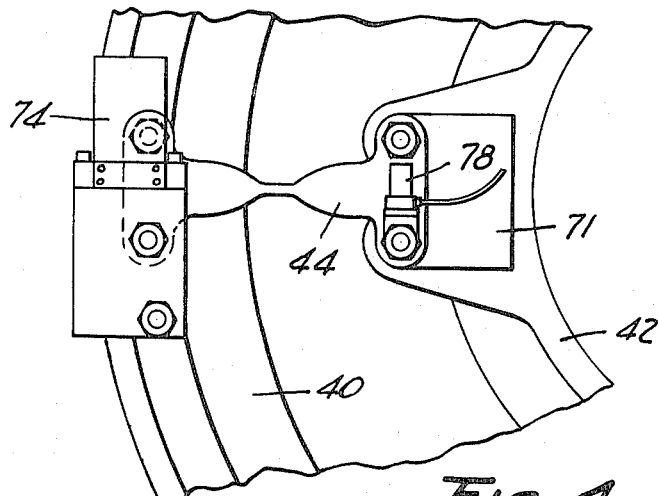
FIGURE 4 is a rear elevation of a section of the apparatus of FIGURE 3.
Figure 5:
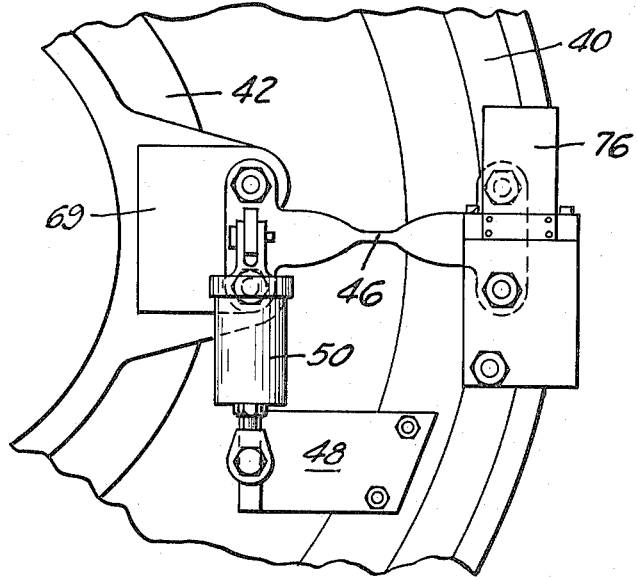
FIGURE 5 is a rear elevation of another section of the apparatus of FIGURE 3.

In FIGURES 3, 4, and 5, a modified form of the foregoing test apparatus is shown having a ring 40 connected to a nonrotating member 42 mounted for axial movement along shaft 30. The ring 40 is connected with the nonrotating member 42 by constant stress spring means 44 and 46. The ring 40 is also connected to the nonrotating member 42 through dashpot damping means 50 supported on a bracket 48 that is connected by appropriate means to the ring 40.

The ring 40 is further connected to a fixed support 52 through a dashpot damping means 54 and an arm 56, the arm 56 being firmly secured to said ring by any suitable means such as the nut and bolt fasteners shown by FIGURE 3.

The arm 56 is also spring restrained as by spring 58 that is affixed to the support 52 and connected to said arm 56 by a load link 60. The load link 60 has familiar strain gauge provisions 62 and 64 therewith incorporated to provide an indication of the mean and vibratory torque developed on the ring 40 and the arm 56. A spring 66 is attached to the support 52 and the damper 54 to relieve the damper of bearing loads so that they may not enter the calculations as extraneous structure.

In addition, the arm 56 has detachable connectors 68 to mount additional weights 70 to vary the weight of the ring 40 and arm 56 in accordance with the mass of the supporting structure for the energy transmitting friction surfaces 72, the nonrotating member 42 mounting said surfaces 72, and the predicted supporting structure for affixing the rotating and nonrotating members to a body. In addition, blocks 69 and 71 are mounted to the nonrotating member 42 as seen in FIGURES 4 and 5 to permit variation of member 42's weight to provide equivalent simulation of the weight of the nonrotating member carrying the linings in their operational environment.

FIGURES 4 and 5 also show means to measure squeal and chatter motions of said nonrotating member and said mass utilizing accelerometers 74 and 76 that are mounted to the ring 40 to measure ring acceleration and thus enable a prediction of the chatter or low frequency mode when surfaces 72 are brought into contact with the rotating member mounted to said shaft 30. Similarly, an accelerometer 78 is mounted on said nonrotating member 42 to measure high frequency excitations to predict the squeal mode. The electrical outputs of these accelerometers as well as from the strain guages 62 and 64 are directed through an amplifier to a recorded such as an oscillograph (not shown).

In operation the dynamometers 8 is started to bring the shaft 30 and rotor 32 up to the desired velocity. Thereafter the brakes are applied by shifting said stator 10 axially to force the discs 12 into engagement with the rotor 32 to brake said rotor 32. This creates the necessary brake torque which by the simulation of the mass, spring rates and damping capacities of the operational environment causes the squeal and chatter motions on said stator 10 and said mass 18 to allow appropriate sensing means, such as accelerometers 74, 76 and 78 and strain gauges 62 and 64 of the modified test apparatus, to produce a measurable signal of the vibrations and enable determination of the characteristics of the lining 12. In more detail, the strain gauges 62 and 64 pickup $(F_{DO})_T$ and $(F_{DV})_T$, the mean and vibratory drag forces respectively, which are inserted in the foregoing equations to determine the airplane mean or vibratroy drag. Similarly, the squeal motions of the airplane installation may be predicted using the squeal accelerometers 74, 76 and 78. These accelerometers would be used for vibratory motion only.

It is to be understood that the use of the invention as presented by the drawings and as described in these specifications is to be taken as but one example of the same and that various uses and arrangements of parts may be resorted to without departing from the spirit of my invention which is only limited by the appended claims.

I claim:
1. A brake lining tester for a wheel and brake assembly comprising:
   a shaft capable of relatively high rotational velocity;
   a rotatable member secured to said shaft;
   a nonrotatable member mounting the brake lining to be tested which member simulates the mounting for the brake lining in its predicted environment;
   actuating means operatively connected to said nonrotatable member for actuating the same to cause slidable engagement of said brake lining with said rotatable member to thereby brake the latter;
   a mass of equivalent weight as that of a support structure for mounting said rotatable and nonrotatable members in their predicted environment;
   means to simulate spring rates of said supporting structure including a constant stress spring means connecting said mass to said nonrotatable member and having a spring rate equivalent to that of the members of the support structure that transmit brake torque to the support structure;
   means to simulate material damping characteristics of the supporting structure;
   said material damping means being operatively connected to said nonrotatable member; and
   means to measure vibrations of said nonrotatable member and said mass during braking of said rotatable member.

2. A means to test brake lining according to claim 1 where said means simulating spring rates also includes a spring means having a spring rate equivalent to that of the support structure in a fore and aft direction and connected at one end to said mass and at an opposite end to a fixed support.

3. A means to test brake lining according to claim 2 where said damping means includes dashpot mechanisms mounted to resist acceleration of said mass.

4. A brake lining tester for a wheel and brake assembly comprising:
   a dynamometer;
   a shaft extending from said dynamometer;
   a nonrotatable member mounting the brake lining to be tested;
   a rotatable member mounted to said shaft to be revolved thereby;
   an actuating mechanism to cause the lining to engage said rotatable member;
   a mass associated with said nonrotatable member for approximating the mass attributable to a predicted support structure for the wheel and brake assembly;
   a first spring means having a spring rate substantially equivalent to the torque spring rate of the predicted support structure for the wheel and brake assembly;
   a second spring means having a spring rate substantially equivalent to the fore and aft spring rate of the predicted support structure for the wheel and brake assembly;
   a first attachment for said first spring means, said mass and said nonrotating member whereby said mass is connected with said nonrotating member by said first spring means;
   a fixed member;
   a second attachment for said second spring means, said mass and said fixed member whereby said mass is held to said fixed member by said second spring means;
   a first damping motor attached to said nonrotating member and said mass in such a manner as to dampen the vibration of said nonrotating member and said mass;
   a second damping means attached to said fixed member and said mass to dampen the acceleration of said mass; and
   vibration pick-up devices whereby the vibrations excited by application of the brake lining to the rotating member are measured to determine squeal and chatter amplitudes that would be induced by the brake lining.

5. A brake lining tester according to claim 4 having provisions to vary the mass to permit various support structure simulation.

6. A brake lining tester according to claim 4 having provisions to vary the weight of the nonrotatable member to permit simulation of various nonrotating members.

7. Means to simulate dynamic characteristics of an aircraft landing gear structure including a wheel, brake and strut assembly comprising:
   a shaft driven by a dynamometer;
   a brake rotor mounted to said shaft;
   a brake stator;
   a brake lining mounted to said stator;
   a mass equivalent to the lumped mass of the strut of the landing gear structure;
   a first spring means having a spring rate substantially equivalent to that existing between the brake and the strut of the landing gear structure;
   a second spring means having a spring rate substantially equivalent to the fore and aft spring rate of the strut of the landing gear structure;
   a first attachment connecting said mass and said brake stator and said first spring means;
   a fixed member;
   a second attachment connecting said mass and said fixed member and said second spring means;
   a damping mechanism operatively connected to said first attachment to impress the predicted material damping capacity of the structure transmitting brake torque to the strut of the landing gear structure;
   a second damping mechanism operatively connected to said second attachment to impress the predicted fore and aft material damping capacity of the strut of the landing gear structure;
   an accelerometer operatively connected to said first attachment and said brake stator to sense squeal motion of said stator;
   at least one accelerometer operatively connected to said first attachment and said mass to sense chatter excitation of said mass; and
   a plurality of strain gauge load capsules to measure mean torque and low frequency oscillatory torque.

References Cited by the Examiner

UNITED STATES PATENTS

| | | | |
|---|---|---|---|
| 2,401,907 | 6/46 | Cahill et al. | 73—134 X |
| 3,059,464 | 10/62 | Deane | 73—9 |

RICHARD C. QUEISSER, *Primary Examiner.*